COATED PARTICLE OXIDE FUEL FOR NUCLEAR REACTORS

Ronald Cyril Burnett, Dorchester, England, assignor to United Kingdom Atomic Energy Authority, London, England
No Drawing. Filed Dec. 11, 1972, Ser. No. 313,625
Claims priority, application Great Britain, Dec. 13, 1971, 57,853/71
Int. Cl. G21c 3/04, 21/02
U.S. Cl. 264—.5      4 Claims

ABSTRACT OF THE DISCLOSURE

A nuclear fuel particle comprises a kernel containing uranium oxide and coated with pyrocarbon which serves to retain the fission products.

Interaction between the uranium oxide and the carbon is reduced by incorporating ceric oxide in the kernel and reducing it to a low valency. The low valency ceric oxide acts as a chemical 'buffer" but as it then has a high affinity for oxygen it is important to keep the kernel out of contact with the atmosphere until it has been coated.

The invention resides in the incorporation of a small amount of molybdenum in the kernel. This checks the affinity of the buffer material for oxygen and even allows the kernels to be stored in air until coated.

This invention relates to nuclear fuel particles for nuclear reactors and aims in particular to provide an improvement in the invention disclosed by our co-pending cognate patent application No. 6,907/71 of Mar. 15, 1971 and No. 35,554/71 of July 28, 1971.

The aforesaid cognate patent application is concerned with the problem which arises when a nuclear fuel oxide is employed as the kernel of the particle and is provided with a fission product retaining coating of pyrocarbon or other carbonaceous substances. As is known the possible interaction between the nuclear fuel oxide and the carbon may lead to the formation of compounds which build up pressures within the particle and can lead eventually to disintegration of the fuel material or its coating. The particular remedy which is described in the aforementioned cognate patent application is to incorporate in the fuel kernel, in close adjacency with the nuclear fuel oxide, a multivalency buffer material which does not in itself take an active part in the fission process, but acts as a chemical buffer between the fissioned atoms of the fuel and substances in the neighbourhood of the fuel which are reactive with oxygen. The application furthermore describes a suitable buffer as being a high melting point variable valency non-fissile material which is at least partially in the lower valency state when it is incorporated in the kernel. The application of this method necessitates that care be taken lest the buffer material be converted to its high valency state prematurely, for this would negative its effect within the manufactured coated particle. With an eye to this possibility the aforesaid cognate patent application recommends that once the buffer material has been introduced into the fuel kernel and reduced to a low valency the kernel is kept out of contact with the atmosphere until it has been coated. This is done by retaining it in a nonoxidising atmosphere. According to one aspect of the present invention, a nuclear fuel particle has a kernel comprising a nuclear fuel oxide, a multivalency buffer material and molybdenum.

The molybdenum retards the affinity of the buffer material for atmospheric oxygen such that less stringent handling conditions become necessary and coating of the particle can be carried out virtually at leisure.

According to another aspect of the invention, a method of manufacturing nuclear fuel particles comprises forming green particles of uranium oxide powder and binder mixed with powdered ceric oxide and molybdenum, heating the green particles to remove binder and re-heating the particles in an atmosphere of argon and hydrogen whereby at least some of the ceric oxide is reduced to a lower valency state, and then coating the particles with fission product retraining material.

One method of manufacturing a nuclear fuel particle according to the invention will now be described by way of example.

Uranium oxide powder (the nuclear fuel oxide) and powdered ceric oxide (the buffer material), both having a particle size less than 30 microns were intimately mixed in proportions such that the atomic ratio U/Ce was 9 together with 3% by weight of stearic acid to serve as as a binder and about 0.5% by weight molybdenum to retard the affinity for oxygen of the ceric oxide. Small spheroidal kernels of about 800 microns diameter were formed from this mixture by the conventional powder agglomeration techniques. The agglomerated kernels were then heated to about 300° C. to remove the binder after which the kernels were heated again for 6 hours at 1500° C in an atmosphere of argon and hydrogen. This heat treatment resulted in the composition of the kernel, after heating, to be a complex compound of uranium and ceric oxide in a stable form described by the chemical formula $U^{0.9}$, $Ce^{0.1}$, $O^{1.95}$. Ceric oxide was thus present in its lower valency form. These kernels were stored in air (instead of the usual non-oxidising atmosphere) until required for coating with fission product retaining coatings of pyrocarbon and silicon carbide. In spite of prolonged storage periods (2 weeks in some cases) in air it was found that the stable cerium oxide compound above remained in its lower valency state. This was due to the presence of the molybdenum, said molybdenum retarding the affinity of any tendency for the ceric oxide to diffuse into the uranium oxide.

The presence of the molybdenum also increased the strength of the kernels.

I claim:

1. A method of manufacturing nuclear fuel particles comprising forming green particles of uranium oxide powder and binder mixed with powdered ceric oxide and molybdenum, said molybdenum retarding the affinity of said ceric oxide for oxygen,, heating the green particles to remove binder and re-heating the particles in an atmosphere of argon and hydrogen whereby at least some of the ceric oxide is reduced to a lower valency state and then coating the particles with fission product retaining material.

2. The method of Claim 1 wherein the atomic ratio of the uranium oxide powder and powdered ceric oxide is 9.

3. The method of Claim 1 wherein the binder comprises 3% by weight of stearic acid.

4. The method of Claim 1 wherein the molybdenum content of the mixture comprises 0.5% by weight.

(References on following page)

References Cited

UNITED STATES PATENTS

| | | | |
|---|---|---|---|
| 3,264,224 | 8/1966 | Fitch et al. | 252—301.1 |
| 3,301,763 | 1/1967 | Beatty et al. | 176—67 |
| 3,375,306 | 3/1968 | Russell et al. | 264—0.5 |
| 3,579,390 | 5/1971 | Paine et al. | 264—0.5 |
| 3,712,809 | 1/1973 | Bumm et al. | 264—0.5 |

OTHER REFERENCES

Markin et al.,: Uranium-Cerium-Oxygen Ternary Phase Diagram," J. Inorg. Nucl. Chem., vol. 32, pp. 59–75, 1970.

CARL D. QUARFORTH, Primary Examiner

R. S. GAITHER, Assistant Examiner

U.S. Cl. X.R.

176—68, 69, 91 SP; 252—301.1 R